(12) United States Patent
Flitcroft et al.

(10) Patent No.: US 8,527,416 B2
(45) Date of Patent: Sep. 3, 2013

(54) BUSINESS-TO-BUSINESS COMMERCE USING FINANCIAL TRANSACTION NUMBERS

(75) Inventors: Daniel Ian Flitcroft, County Dublin (IE); Graham O'Donnell, Sandycove (IE); Conor Langford, Dublin (IE); James Carroll, Dublin (IE)

(73) Assignee: Orbis Patents Limited, Dublin (IE)

( * ) Notice: Subject to any disclaimer, the term of this patent is extended or adjusted under 35 U.S.C. 154(b) by 373 days.

(21) Appl. No.: 12/010,082

(22) Filed: Jan. 18, 2008

(65) Prior Publication Data

US 2008/0120238 A1 May 22, 2008

Related U.S. Application Data

(62) Division of application No. 10/160,190, filed on Jun. 4, 2002.

(60) Provisional application No. 60/294,974, filed on Jun. 4, 2001, provisional application No. 60/295,019, filed on Jun. 4, 2001.

(51) Int. Cl.
*G06Q 20/04* (2012.01)
*G06Q 20/40* (2012.01)

(52) U.S. Cl.
CPC .................................. *G06Q 20/40* (2013.01)
USPC .......................................................... 705/44

(58) Field of Classification Search
USPC ............................................. 705/35, 40, 44
See application file for complete search history.

(56) References Cited

U.S. PATENT DOCUMENTS

| | | | |
|---|---|---|---|
| 3,938,091 | A | 2/1976 | Atalla et al. |
| 4,423,316 | A | 12/1983 | Sano et al. |
| 4,707,592 | A | 11/1987 | Ware |
| 4,720,860 | A | 1/1988 | Weiss |
| 4,725,719 | A | 2/1988 | Oncken et al. |
| 4,747,050 | A | 5/1988 | Brachtl et al. |
| 4,797,920 | A | 1/1989 | Stein |
| 4,856,062 | A | 8/1989 | Weiss |
| 4,874,932 | A | 10/1989 | Kimizu |

(Continued)

FOREIGN PATENT DOCUMENTS

| | | |
|---|---|---|
| CA | 2623846 A1 | 3/2008 |
| EP | 0 081 921 | 6/1983 |

(Continued)

OTHER PUBLICATIONS

Ketchpel et al., "Shopping Models: A Flexible Architecture for Information Commerce," Library Project Working Paper SIDL-WP-19960052, 1996.

(Continued)

*Primary Examiner* — Bruce I Ebersman
(74) *Attorney, Agent, or Firm* — Buchanan Ingersoll & Rooney PC

(57) ABSTRACT

Controlled Payment Numbers (CPNs) which issue as a unique payment number for each transaction uniquely identify the transaction for matching the purchase and payment information. The issuance of the CPN is controlled by business rules which are designed to and effectively restrict the use of the CPN, such that if a user exceeds his authorization, a CPN is not issued. The business rules are set up according to a hierarchy of users. Further, a declining balance CPN is also provided.

6 Claims, 9 Drawing Sheets

(56) References Cited

U.S. PATENT DOCUMENTS

| | | |
|---|---|---|
| 4,893,330 A | 1/1990 | Franco |
| 4,941,090 A | 7/1990 | McCarthy |
| 4,988,849 A | 1/1991 | Sasaki et al. |
| 4,998,279 A | 3/1991 | Weiss |
| 5,023,904 A | 6/1991 | Kaplan et al. |
| 5,093,861 A | 3/1992 | Graham |
| 5,097,505 A | 3/1992 | Weiss |
| 5,117,355 A | 5/1992 | McCarthy |
| 5,130,519 A | 7/1992 | Bush et al. |
| 5,163,097 A | 11/1992 | Pegg |
| 5,193,114 A | 3/1993 | Moseley |
| 5,196,840 A | 3/1993 | Leith et al. |
| 5,202,826 A | 4/1993 | McCarthy |
| 5,231,570 A | 7/1993 | Lee |
| 5,239,583 A | 8/1993 | Parrillo |
| 5,287,268 A | 2/1994 | McCarthy |
| 5,317,636 A | 5/1994 | Vizcaino |
| 5,323,338 A | 6/1994 | Hawthorne |
| 5,326,960 A | 7/1994 | Tannenbaum |
| 5,343,529 A | 8/1994 | Goldfine et al. |
| 5,350,906 A | 9/1994 | Brody et al. |
| 5,363,449 A | 11/1994 | Bestock |
| 5,428,684 A | 6/1995 | Akiyama et al. |
| 5,466,919 A | 11/1995 | Hovakimian |
| 5,478,994 A | 12/1995 | Rahman et al. |
| 5,479,494 A | 12/1995 | Clitherow |
| 5,485,510 A | 1/1996 | Colbert |
| 5,500,513 A | 3/1996 | Langhans et al. |
| 5,504,808 A | 4/1996 | Hamrick, Jr. |
| 5,555,497 A | 9/1996 | Helbling |
| 5,577,109 A | 11/1996 | Stimson et al. |
| 5,583,918 A | 12/1996 | Nakagawa |
| 5,592,553 A | 1/1997 | Guski et al. |
| 5,606,614 A | 2/1997 | Brady et al. |
| 5,621,201 A | 4/1997 | Langhans et al. |
| 5,627,355 A | 5/1997 | Rahman et al. |
| 5,671,279 A | 9/1997 | Elgamal |
| 5,677,955 A | 10/1997 | Doggett et al. |
| 5,694,471 A | 12/1997 | Chen et al. |
| 5,696,908 A | 12/1997 | Muehlberger et al. |
| 5,715,314 A | 2/1998 | Payne et al. |
| 5,721,768 A | 2/1998 | Stimson et al. |
| 5,724,424 A | 3/1998 | Gifford |
| 5,748,908 A | 5/1998 | Yu |
| 5,757,917 A | 5/1998 | Rose et al. |
| 5,768,381 A | 6/1998 | Hawthorne |
| 5,777,305 A | 7/1998 | Smith et al. |
| 5,777,306 A | 7/1998 | Masuda |
| 5,825,881 A | 10/1998 | Colvin, Sr. |
| 5,826,241 A | 10/1998 | Stein et al. |
| 5,826,243 A | 10/1998 | Musmanno et al. |
| 5,832,087 A | 11/1998 | Hawthorne |
| 5,864,830 A | 1/1999 | Armetta et al. |
| RE36,116 E | 2/1999 | McCarthy |
| 5,868,236 A | 2/1999 | Rademacher |
| 5,878,141 A | 3/1999 | Daly et al. |
| 5,883,810 A | 3/1999 | Franklin et al. |
| 5,884,271 A | 3/1999 | Pitroda |
| 5,890,137 A | 3/1999 | Koreeda |
| 5,893,907 A | 4/1999 | Ukuda |
| 5,903,830 A | 5/1999 | Joao et al. |
| 5,903,878 A | 5/1999 | Talati et al. |
| 5,949,044 A | 9/1999 | Walker et al. |
| 5,953,710 A | 9/1999 | Fleming |
| 5,956,699 A | 9/1999 | Wong et al. |
| 5,963,925 A | 10/1999 | Kolling et al. |
| 5,984,180 A | 11/1999 | Albrecht |
| 5,987,118 A | 11/1999 | Dickerman et al. |
| 5,991,750 A | 11/1999 | Watson |
| 6,000,832 A | 12/1999 | Franklin et al. |
| 6,012,048 A | 1/2000 | Gustin et al. |
| 6,029,890 A | 2/2000 | Austin |
| 6,032,133 A | 2/2000 | Hilt et al. |
| 6,144,948 A | 11/2000 | Walker et al. |
| 6,163,771 A | 12/2000 | Walker et al. |
| 6,185,545 B1 | 2/2001 | Resnick et al. |
| 6,188,761 B1 | 2/2001 | Dickerman et al. |
| 6,193,155 B1 | 2/2001 | Walker et al. |
| 6,227,447 B1 | 5/2001 | Campisano |
| 6,240,397 B1 | 5/2001 | Sachs |
| 6,267,292 B1 | 7/2001 | Walker et al. |
| 6,298,335 B1 | 10/2001 | Bernstein |
| 6,324,526 B1 | 11/2001 | D'Agostino |
| 6,339,766 B1 | 1/2002 | Gephart |
| 6,341,724 B2 | 1/2002 | Campisano |
| 6,343,279 B1 | 1/2002 | Bissonette et al. |
| 6,352,205 B1 | 3/2002 | Mullins et al. |
| 6,375,084 B1 | 4/2002 | Stanford et al. |
| 6,380,959 B1 | 4/2002 | Wang et al. |
| 6,393,411 B1 | 5/2002 | Bishop et al. |
| 6,408,284 B1 | 6/2002 | Hilt et al. |
| 6,422,462 B1 | 7/2002 | Cohen |
| 6,598,031 B1 | 7/2003 | Ice |
| 6,636,833 B1 | 10/2003 | Flitcroft et al. |
| 6,826,542 B1 | 11/2004 | Virgin et al. |
| 6,885,857 B1 | 4/2005 | Henson |
| 6,901,387 B2 | 5/2005 | Wells et al. |
| 6,931,382 B2 | 8/2005 | Laage et al. |
| 7,136,835 B1 | 11/2006 | Flitcroft et al. |
| 7,181,432 B2 | 2/2007 | Wells et al. |
| 7,319,986 B2 | 1/2008 | Praisner et al. |
| 7,389,275 B2 | 6/2008 | Kemper et al. |
| 7,427,021 B2 | 9/2008 | Kemper et al. |
| 7,433,845 B1 | 10/2008 | Flitcroft et al. |
| 7,567,934 B2 | 7/2009 | Flitcroft et al. |
| 7,571,142 B1 | 8/2009 | Flitcroft et al. |
| 7,593,896 B1 | 9/2009 | Flitcroft et al. |
| 2001/0047336 A1 | 11/2001 | Maycock et al. |
| 2002/0099642 A1 | 7/2002 | Schwankl et al. |
| 2002/0099649 A1 | 7/2002 | Lee et al. |
| 2002/0120587 A1 | 8/2002 | D'Agostino |
| 2002/0160771 A1 | 10/2002 | Massie et al. |
| 2003/0018567 A1 | 1/2003 | Flitcroft et al. |
| 2003/0023498 A1* | 1/2003 | Benton ............................ 705/26 |
| 2003/0097331 A1 | 5/2003 | Cohen |
| 2003/0110136 A1 | 6/2003 | Wells et al. |
| 2003/0216997 A1 | 11/2003 | Cohen |
| 2003/0233334 A1 | 12/2003 | Smith |
| 2004/0068469 A1 | 4/2004 | Atig |
| 2004/0128243 A1 | 7/2004 | Kavanagh et al. |
| 2005/0086169 A1 | 4/2005 | Wells et al. |
| 2006/0031161 A1 | 2/2006 | D'Agostino |
| 2007/0198411 A1 | 8/2007 | Kavanagh et al. |
| 2008/0120238 A1 | 5/2008 | Flitcroft et al. |
| 2009/0012897 A1 | 1/2009 | Flitcroft et al. |
| 2009/0037333 A1 | 2/2009 | Flitcroft et al. |
| 2009/0070260 A1 | 3/2009 | Flitcroft et al. |
| 2009/0134217 A1 | 5/2009 | Flitcroft et al. |

FOREIGN PATENT DOCUMENTS

| | | |
|---|---|---|
| EP | 0 590 861 | 4/1994 |
| EP | 0 590 961 | 4/1994 |
| EP | 0 745 961 | 12/1996 |
| EP | 0 745 961 | 11/2001 |
| EP | 1 153 375 A1 | 11/2001 |
| EP | 1 821 249 A1 | 4/2006 |
| EP | 1 821 249 A1 | 7/2006 |
| FR | 2 661 996 | 11/1991 |
| GB | 2 145 265 | 3/1985 |
| GB | 2 252 270 | 8/1992 |
| GB | 2 305 393 | 4/1997 |
| GB | 2 327 831 | 2/1999 |
| GB | 2 361 790 | 10/2001 |
| JP | 06-282556 | 10/1994 |
| KR | 20030002534 | 1/2003 |
| KR | 20060089697 | 8/2006 |
| WO | WO 91/12680 | 8/1991 |
| WO | WO 91/12693 | 8/1991 |
| WO | WO 93/14476 | 7/1993 |
| WO | WO 95/07512 | 3/1995 |
| WO | WO 96/08756 | 3/1996 |
| WO | WO 96/42150 | 12/1996 |
| WO | WO 97/15893 | 5/1997 |
| WO | WO 97/19549 | 5/1997 |

| | | |
|---|---|---|
| WO | WO 98/26376 | 6/1998 |
| WO | WO 98/30985 | 7/1998 |
| WO | WO 99/49424 | 9/1999 |
| WO | WO 00/49586 A1 | 8/2000 |
| WO | WO 03/001866 A1 | 1/2003 |
| WO | WO 03/050741 A2 | 6/2003 |
| WO | WO 2004/086171 A2 | 10/2004 |
| WO | WO 2004/086717 A3 | 10/2004 |

OTHER PUBLICATIONS

Morrall, "Where the Card is King," Credit Card Management, p. 12, Sep. 1992.

Web page for "Virtual Credit Card (VCC)," found at http://www.geocities.com/Eureka/Park/5014/vcc.htm bearing the parent, putative date of Aug. 9, 1998.

Durbin, "ASTA Unit: No Active Status for SATO," Travel Weekly, Jan. 26, 1987, vol. 45, p. 92.

Jones, "ACE Server to Ship for NT," InfoWorld, Feb. 3, 1997, vol. 19, No. 5, p. 8.

Yamada, "Security Dynamics Plans to Launch Reseller Program," Computer Reseller News, Aug. 19, 1996, No. 697, p. 65.

Davis, "Vendors Put New Spin on Security Wares," Communications Week, Mar. 27, 1995, No. 549, p. 5.

"Security Dynamics & Cisco Offer 'Crackerproof' Routers," Newsbytes News Network, Jun. 20, 1994.

Highland, "With Tokens, It's a New Password Every Time," Computerworld, Jun. 11, 1990, vol. 24, No. 24, pp. 88-89.

"Security Dynamics Announces ACE/Client for NT/RAS," Business Wire, Mar. 27, 1995.

"Security Dynamics Expands Level of User Authentication for Internet Security," Business Wire, Mar. 27, 1995.

"Enigma Logic: Enigma Logic Introduces SafeWord SofToken," Business Editors & Computer Writers Jun. 1, 1994.

Brown, "TGV Launches Token-Based Security Ware," Communications Weeks, Oct. 31, 1994, No. 529, p. 4.

"CRYPTOCard 2: CRYPTOCard Enables Companies and ISPs to Secure Intranet Access with Authentication Tokens at Much Lower Costs," Business Wire, Jun. 29, 1998.

Lamond, Credit Card Transaction Real World and Online, 1996, http://www.virtualschool.edu/mon/electronicproperty/clamond/creditcard.htm.

Wiggins, "Putting Risk in Perspective," http://www.webreference.com/outlook/column3/page4.html, 1997.

Crotch-Harvey, Electronic Money and the Law—The Implications, http://www.smartcard.co.uk/articles/electronicmoney.html.

B. Ives & M. Earl, Mondex International: Reengineering Money, http://isds.bus.isu.edu/cases/mondex.html, 1997.

Herscheim, "Smart Card," http://disc.cba.uh.edu/~rhirsch/fall96/neepa.htm, Sep. 24, 1996.

NetChex—"Announcement: Jan. 11, 1995 NetChex offers Secure Checking to the Web," http://www.ntrg.cs.tcd.ie/mepeirce/Project/Press/netchex.html, 1995.

Agora: "A minimal Distributed Protocol of Electronic Commerce," USENIX Workshop on Electronic Commerce, http://www.usenix.org/publications/library/proceedings/ec96/full_papers/grabber/html/ held from Nov. 18-21, 1996.

GE Capitol Financial, Inc., "Corporate E-Card and E-Commerce Glossary," http://www.ge.com/capital/cardservices/corpcard/5news5.html.

"NetChex—a short brief," http://www.tml.hut.fi/Studies/Tik-110.350/1997/Ecommerce/netchex_5.html, 1997.

GE Capital Financial, Inc. "GE Pre-Authorization System," www.ge.com/capital/cardservices/corpcard/3pcard4.htm.

Owen Thomas; Moolah; Online Cash; Money Changers; www.ecompany.com; Oct. 2000.

Flitcroft et al., Copending U.S. Appl. No. 10/160,190, filed Jun. 4, 2002.

Flitcroft et al., Copending U.S. Appl. No. 12/219,952, filed Jul. 30, 2008.

Flitcroft et al., Copending U.S. Appl. No. 12/222,958, filed Aug. 20, 2008.

Flitcroft et al., Copending U.S. Appl. No. 12/268,063, filed Nov. 10, 2008.

Flitcroft et al., Copending U.S. Appl. No. 12/359,971, filed Jan. 26, 2009.

V. Moscaritolo, Digital Commerce for the Rest of US Apple in a Geodesic Economy, http://www.shipwright.com/rants/rant_15.html, Sep. 4, 1996.

Visa, third parties add technology to protect shoppers and merchants Anonymous. Credit Card News. Chicago: Nov. 15, 2000, p. 1, 2.

Clayton, Michelle, "The case for debit cards," America's Community Banker, v 7, n. 3, p. 22-27, Mar. 1998.

After Mexican Operations Work, Total Systems Moves Into Canada. Card News. Potomac: Feb. 16, 1998. vol. 13, Iss. 3; p. 1.

Defuse the debit-card bomb Banks and credit card companies OK caps on consumer liability, but the limits should be enforced by new federal law, too; [Second Edition] San Francisco Examiner. San Francisco, Calif.: Aug. 18, 1997. p. A.14.

International Search Report dated Apr. 27, 2010, in corresponding PCT Application No. PCT/US2009/005029, 7 pps.

* cited by examiner

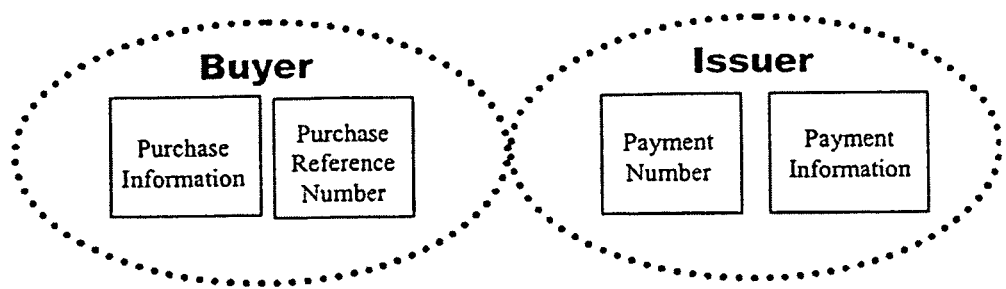
Figure 1: (Prior Art)
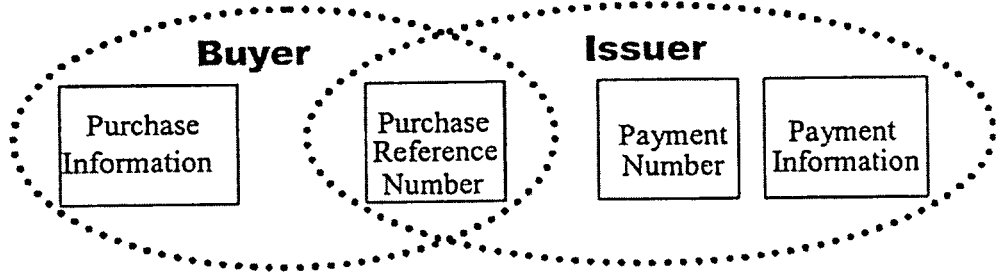
Figure 2: (Prior Art)
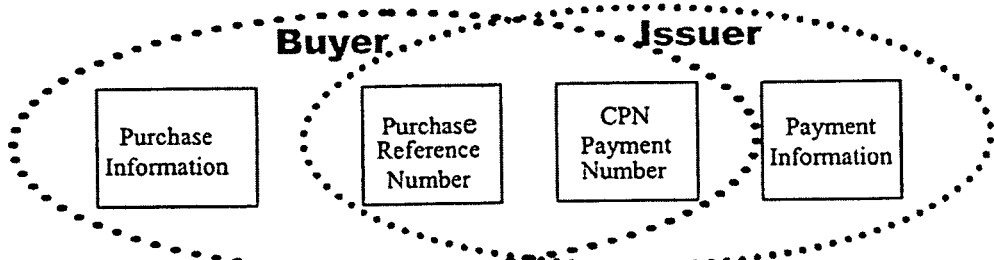
Figure 3

BUSINESS-TO-BUSINESS COMMERCE USING FINANCIAL TRANSACTION NUMBERS

CROSS REFERENCE TO RELATED APPLICATIONS

This application is a divisional of U.S. application Ser. No. 10/160,190, filed Jun. 4, 2002, which claims priority to U.S. Provisional Application Nos. 60/294,974 and 60/295,019, both filed in the United States on Jun. 14, 2001 and both herein incorporated by reference.

FIELD OF THE INVENTION

The present invention relates to a system controlled by data bearing records, and more specifically to a credit or other form of financial transaction card number system. As explained in greater detail below, the present invention provides for business-to-business transactions using financial transaction numbers (e.g., specifically Controlled Payment Numbers (CPNs)) as accounting tools.

BRIEF DESCRIPTION OF RELATED ART

I. Matching

The principle of matching is a fundamental basis of accounting. In its effort to ensure that a proper audit trail exists for all transactions, accounting protocols require a clear, unambiguous reconciliation of purchase order, invoice and payment data. Companies using credit cards must also meet this requirement.

There are four important types of information created in a purchasing/credit card payment cycle that are of significance to a business. They are: purchase information, purchase reference number, payment number and payment information. Each will be described below.

1) Purchase Information (User Defined Information)

The purchase information is user defined and is the specific line item detail of a purchase. It contains information about: quantity; description; product codes; price; tax; and a general ledger cost code or codes to which the goods are allocated. Typically this is the information that is contained in the purchase order a company provides to its supplier.

Whether the business is using an electronic purchase system or hand written purchase orders, every business needs to match the goods ordered and received with the suppliers invoice and payment to the supplier within its own financial accounting system.

2) Purchase Reference Number

The purchase reference number is a unique reference number a business creates internally to track each individual order. It is in turn used by the supplier as "proof of demand" when corresponding with the buying organisation.

Card schemes provide a data field on the settlement file for merchants to input such a reference number, typically the Purchase Order (PO) number, to help the buyer reconcile the transaction when the buyer receives the card statement.

3) Payment Number

The payment number tracks a specific payment made by a business to a supplier. If the payment is made by cheque, the individual cheque number is a unique identifier that differentiates the payment from other payments made from the same bank account.

When a credit card is used the payment number is the credit card number. This payment reference will apply to all items paid for using that card.

4) Payment Information

The payment information is the information provided by the issuer that appears on the card holders statement. In standard card products the detail is limited to merchant name, transaction amount and date that the payment is posted to the cardholder account, i.e., the settlement date.

II. The Issuer and Data Provision

In an effort to meet the business cardholders needs around purchase and payment information reconciliation, conventional card schemes have devised two additional levels of data that certain merchants provide to the card scheme. The content and format of this information aids the reconciliation process for the user.

Level 1 Data: Basic Credit Card Information

Level 1 data is similar to the information on a persons personal credit card statement. This information includes: date; supplier; and transaction amount.

Level 2 Data: Customer Defined Transaction Data

Transactions that include Level 2 data include Level 1 data plus: sales tax; and variable data field (typically a purchase order number).

Suppliers who are Level 2 capable have the ability to pass sales tax information as well as a unique transaction data field (typically limited to 16 characters) through the purchasing card system. Some issuers pass this data to the cardholder statement but it is not mandatory for merchants to use this variable field.

Level 3 Data: Line Item Detail

Transactions that include Level 3 data include Level 1 and Level 2 data plus: item product code; item description; item quantity; item unit of measure; and item price; item tax treatment (e.g. 17.5%).

III. Limitations of Current Card Product Functionality

As illustrated by the diagram of FIG. 1, the matching of purchasing and payment information is a manual process for users of standard commercial cards. The payment information provided by the issuer is short on the necessary detail to allow easy allocation of cost codes. Businesses consume significant staff "back office" cost trying to reconcile the individual line item payment information from a statement to the purchase record in its own system, and in turn allocating all associated costs to the correct cost codes in their accounting system.

Tracking the payment information to the individual user or department can be further complicated if the merchant does not provide level 2 data as many purchases are made against one payment number, i.e., the credit card number.

When the buyer organisation requires level-2 and level-3 data as illustrated in the diagram of FIG. 2, there is total reliance on the merchant to provide it through the scheme. Incorrect and/or insufficient data results in additional back office cost for the buyer.

The card schemes recognised the expense incurred in manually matching the purchase and payment information. The payment information (settlement file) was enhanced to include a reference number, which could be used as the matching instrument. Buying companies are reliant on (a) card acceptors (merchants) to include the buyer's unique reference number in the payment message submitted to an issuer through the card scheme network and (b) the issuer to include it in reports and electronic files accessed by the company. The buying company does not get its reference number with its payment information in many transactions.

U.S. Pat. No. 5,991,750 proposes one approach to the issue of matching and authorization control. It uses a preauthorization step, wherein an account user requests authorization to use a credit card to purchase goods or services of an account manager. The account manager, if so inclined, will obtain price quotations, and issue a preauthorization request to the card issuer. The card issuer will forward the preauthorization request to an authorizing agent. The preauthorization will request various details about the purchase and apparently a transaction identifier. When the account user attempts to make a purchase, and the merchant requests transaction authorization of the authorizing agent, the transaction parameters are checked against the preauthorization request details.

This system suffers from a number of problems, including the need for intervention by an account manger and apparent need to transmit a transaction identifier in order to match the transaction authorization request with a preauthorization request. As mentioned, some merchants fail to provide this additional information.

U.S. Pat. No. 6,343,279 provides for a preapproved transaction wherein the transaction details are input to create an obligation, but before a purchase order is submitted to a merchant. This provides for greater accounting flexibility and matching but would seem to tie up funds and accounting resources until the purchase transaction is completed due to the obligation created at the time of transaction initiation. This could prove problematic if the purchase order was delayed or was not presented.

Another approach is to provide a hierarchical departmental structure, such as disclosed in U.S. Pat. Nos. 5,500,513 and 5,621,201, wherein automated purchasing control is provided by assigning different authorization levels to each card. When a request for a transaction is presented, the authorization tests are performed and the transaction is accepted or declined. While the authorization tests can be altered, the tests are against a card used for many transactions, and if a transaction is presented late, it might be subjected to tests not present when the transaction was initiated. Plus, there is the issue of matching post-transactions.

Another problem with conventional systems is that they do not provide for deferred payment scheduling or a declining balance card on a business-to-business level.

SUMMARY OF THE INVENTION

I. Matching the Purchase Information with the Payment Information

A key principle of the matching functionality of the present invention is that all relevant purchase order information is captured pre-purchase by the inventive software application or the buying company's existing purchase system and linked to a Controlled Payment Number (CPN) at the time of a CPN request and generation. The payment information in the settlement file also contains the CPN as the Primary Account Number (PAN), thus allowing the CPN software platform to unambiguously match the PO, invoice and payment information either on the inventive software platform or on the users system.

The present invention can be embodied as a method of conducting business-to-business commerce using financial transaction numbers. The method includes the steps of capturing relevant purchase order information before initiating a purchase of a product, wherein said relevant purchase order information includes user defined line item detail of a purchase; requesting issuance of a CPN by a user; generating a CPN in response to said request; and linking said relevant purchase order information to a CPN at the time of a CPN request and generation, whereby said relevant purchase order information is linked to said CPN regardless of whether a merchant receives or relays said relevant purchase order information.

II. Deferred Payment Scheduling and Declining Balance Transaction Numbers

The present invention can also be embodied as a method of scheduling deferred payments and providing for a declining balance transaction card. The method includes the steps of a company issuing a physical CPN card which is linked to a company's 'real' account details; the company sets control limits associated with the physical CPN card, including at least one characteristic selected from the group consisting of: a number of days before an available balance is refreshed, the maximum spending limit during that period, and the merchants/merchant-categories with which the card can be used, and the company activates a CPN on the physical CPN card for use by an employee; when a purchase is attempted, the CPN issuer checks whether the authorisation details are within the controls set by the company; the CPN details are replaced with the 'real' account details and the request is routed to existing authorisation processing, if the authorization details are within the controls set by the company; and if the purchase attempt is accepted, a remaining amount of the maximum spending limit is updated.

In still another embodiment, a payment can be deferred by giving the CPN a start date later than the transaction date or requiring a user to approve the transaction before settlement.

III. Defined User Profile Hierarchy

The present invention can further be used to define user rights in a hierarchical structure for the issuance of CPNs. The present invention may be embodied in a method of setting up a hierarchy of users of Controlled Payment Numbers (CPNs) within an organization, comprising the steps of: registering an organization with a CPN issuer; allowing registered organizations to define a hierarchy of users, at least one of which is a supervisor capable of defining user rights for at least one other user; defining user rights as a subset of all possible CPN uses for each of said users, said defined user rights subset being controlled by said supervisor for at least one other user; requesting a CPN by a user including defining CPN uses for particular transaction; and checking said particular transaction user-defined CPN against said subset of CPN uses for the requesting user to determine whether a CPN should issue for the requesting user's use.

BRIEF DESCRIPTION OF THE DRAWING FIGURES

The present invention will be described by way of exemplary embodiments, to which it is not limited, illustrated in the accompanying drawings. A brief description of the drawings follows.

FIG. 1 graphically illustrates limitations of conventional card product functionality.

FIG. 2 graphically illustrates reliance on the merchant by buyer organisations which require level-2 and level-3 data using conventional schemes.

FIG. 3 illustrates that a purchase reference number is stored with CPN inventive software in accordance with the present invention.

DETAILED DESCRIPTION OF EXEMPLARY EMBODIMENTS

Figure 4:
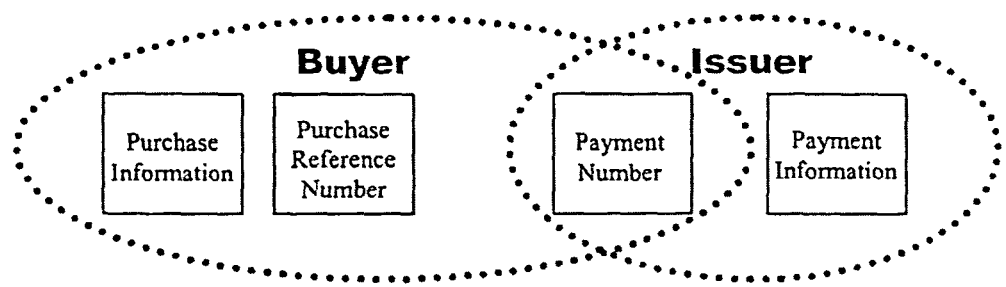
FIG. 4 illustrates that a CPN can be stored with purchase details on a buyer's system.
Figure 5:
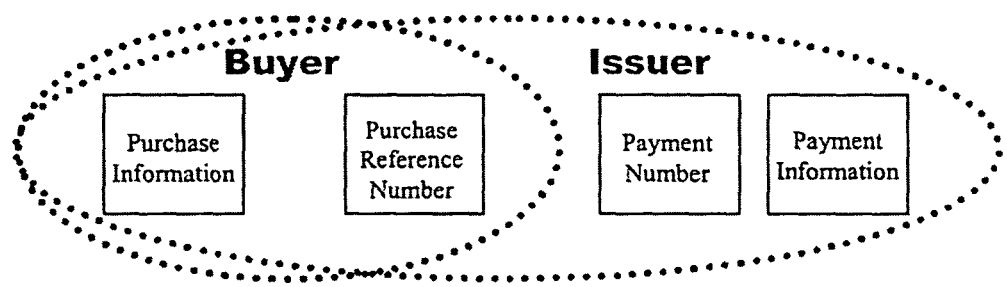
FIG. 5 illustrates that purchase details can be stored with a CPN on the inventive software platform in accordance with the present invention.

The following terms are used throughout the document:

| TERM | DESCRIPTION |
| --- | --- |
| CPN | Controlled Payment Number - a primary account number, expiry data, and additional verification value (CVV2, CVC2) that are issued by the CPN software platform and used instead of the cardholder's 'real' account details in a transaction. |
| CPN software platform | The inventive B2B platform that is installed by an issuer and used to issue controlled payment numbers. |
| 'Real' Account | The cardholder's account on the issuing bank's card management system. |

I. Matching Purchase and Payment Information

The buying company can generate a Controlled Payment Number (CPN) for each purchase. A CPN is a number formatted identically to conventional financial transaction card numbers (e.g., credit cards, debit cards, hybred cards, and the like) to which someone other than the issuing institution (e.g., the CPN user) can assign limitations on its use. Details of CPN technology can be found in U.S. patent application Ser. Nos. 09/235,836 filed on Jan. 22, 1999, and 09/506,830 filed on Feb. 18, 2000, both herein incorporated by reference. In the earlier applications CPNs were also known as limited use credit card numbers. The CPN generation and its attributes are also explained below.

The CPN request can include the buying company's unique purchase reference number such as illustrated in FIG. 3, if desired for internal accounting procedures. Of course, the CPN, being unique for each purchase, can be used for as the unique purchase reference number if desired.

The buyer 62 uses this CPN to pay for the related purchase and can access reports and electronic files on the CPN software platform 61 that can include a purchase reference number with the payment number that a merchant/supplier 63 has submitted through the card scheme network to an issuer 64, i.e., the entity who issued the CPN, or upon whose authority the CPN issued.

Alternatively, when the company 62 generates a purchase order it can request a CPN from the CPN software platform 61 and include it with the other details on its existing systems. A different CPN is generated for each purchase order. The company can access reports and electronic files on the CPN software platform 61 with the payment information for this CPN and unambiguously match it with the correct purchase details on its systems using the unique CPN.

The inventive software platform 61 can also be configured to accept the purchase information as well as the purchase reference number when the buying company is requesting a CPN. These purchase details are associated with the CPN and are matched with the payment information that the merchant submits to the issuer through the card scheme network, which includes the unique CPN as the Primary Account Number (PAN).

In all scenarios, the uniqueness of the CPN is used to unambiguously match the purchase and payment information.

The present invention also provides a solution to the enterprise level purchasing requirements by providing for both deferred payment scheduling and declining balance card.

II. Deferred Payment Scheduling

Figure 6:
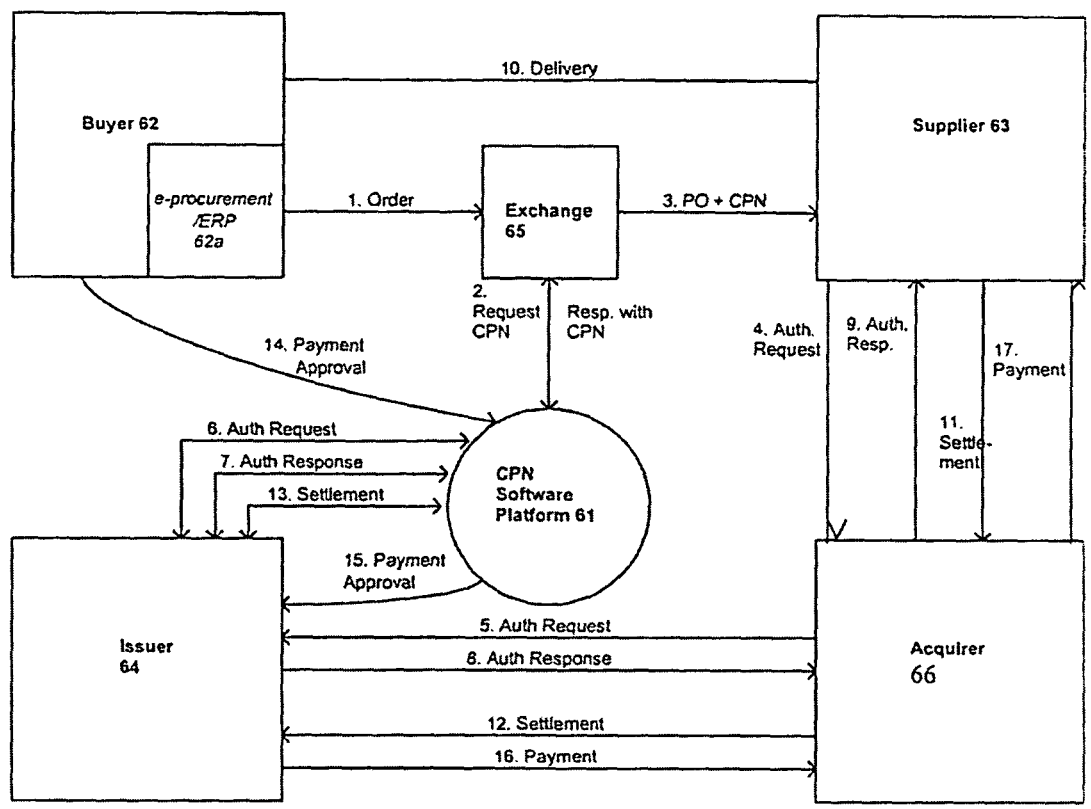
FIG. 6 is a flow chart in accordance with the present invention.

Corporate purchasers may wish to provide functionality to schedule the settlement of a card transaction with the supplier. The buyer uses e-procurement software 62a and can be a member of an exchange 65. The process flow for a deferred payment transaction using a CPN software platform 61 in accordance with the present invention is described below. It is assumed that the issuing bank or other type of authority 64 has reserved a BIN/BIN-Range (BIN meaning Bank Identification Numbers) and the users have been registered on the CPN software platform 61. As shown in FIG. 6, the present invention follows the following data flow:

Step 1: A user interfaces with e-procurement software 62a and/or B2B exchange 65 to place orders with the supplier 63.

Step 2: A request is routed to CPN software platform 61 for a controlled payment number (CPN). The request can be generated by the user through the a purchase browser-based front-end interface or directly from the e-procurement/exchange software 62a, 65. The CPN software platform 61 authenticates the source of the request. Controls included in the request are associated with the CPN on the CPN software platform 61 and the CPN is issued. The CPN is set with a payment-not-approved status.

Step 3: When the supplier 63 receives the order with the CPN as the payment instrument, the supplier 63 treats it the same as any other card details because the CPN has all the characteristics of a conventional transaction card. No additional cooperation is required of the merchant/supplier 63 beyond the Level 1 communications.

Step 4: The supplier 63 requests approval from the buyer's bank 66 for the transaction through his bank (commonly called the "acquirer" or acquiring bank) 66.

Step 5: The acquirer 66 recognises the CPN platform's purchase BIN/BIN-Range and routes the request directly to the issuing bank 64.

Step 6: The issuing bank 64 recognises the CPN platform's purchase BIN/BIN-Range and routes the request to the CPN software platform 61. CPN software platform 61 checks the authorisation details against the controls associated with the CPN set by the buyer 62. If the details exceed any of the controls, the CPN software platform 61 generates a decline response. Otherwise the CPN software platform 61 replaces the CPN details with the 'real' account details and forwards the request to the issuer 64.

Step 7: The issuing bank 64 processes the authorisation request as normal (Card status ok? Sufficient funds?) and generates an approval or decline response. In some embodiments, this check could be done in the CPN software platform 61, if the issuing bank provides and updates the relevant information to the CPN software platform 61. The response is returned to the CPN software platform 61. The CPN software platform 61 logs the response, replaces the 'real' details with the corresponding CPN details, and returns the response to the issuing bank legacy systems.

Step 8. The issuing bank 64 returns the authorisation response to the acquirer 66.

Step 9. The acquirer 66 returns the response to the supplier 63.

Step 10. The supplier 63 completes the transaction and the buyer 62 receives the ordered goods/services.

Step 11. The supplier 63 presents the transaction details for settlement with the acquirer 66. The supplier 63 is not paid at this point.

Step 12. The acquirer recognises the BIN/BIN-Range of the transaction and presents the transaction directly to the issuing bank 64 for settlement. The acquirer 66 is not paid at this point.

Step 13. The issuing bank 64 recognises the BIN/BIN-Range and routes the settlement message to the CPN software platform 61. The CPN software platform 61 replaces the CPN details with the 'real' account details and forwards the message to the issuing bank 64 (CPN software platform 61 can check settlement details against the associated CPN controls and flag the transaction as required, if configured by the issuing bank to do so). The issuing bank 64 posts the transaction to the buyer's 'real' account and seeks payment as normal.

Step 14. The user reviews his transactions on the CPN software platform 61 through the CPN software platform's browser-based front-end interface, the existing e-procurement/exchange software 62a, 65, or the issuing bank statements and/or reporting software. The user can select transactions that are completed to his satisfaction and can flag these for payment. The CPN software platform 61 may automatically flag transactions for payment (1) on a certain date or (2) a certain number of days after the CPN is issued, if the user includes these instructions in the CPN request.

Step 15. The CPN software platform 61 generates a payment approval message for each of these transactions and routes them to the issuing bank 64. The payment approval message may be routed directly to the acquirer 66 if desired.

Step 16. The issuing bank 64 pays the acquirer 66 for these transactions.

Step 17. The acquirer 66 pays the supplier 63.

III. Declining Balance Card

A preferred format for a declining balance card in accordance with the present invention includes the following characteristics.

Figure 7:
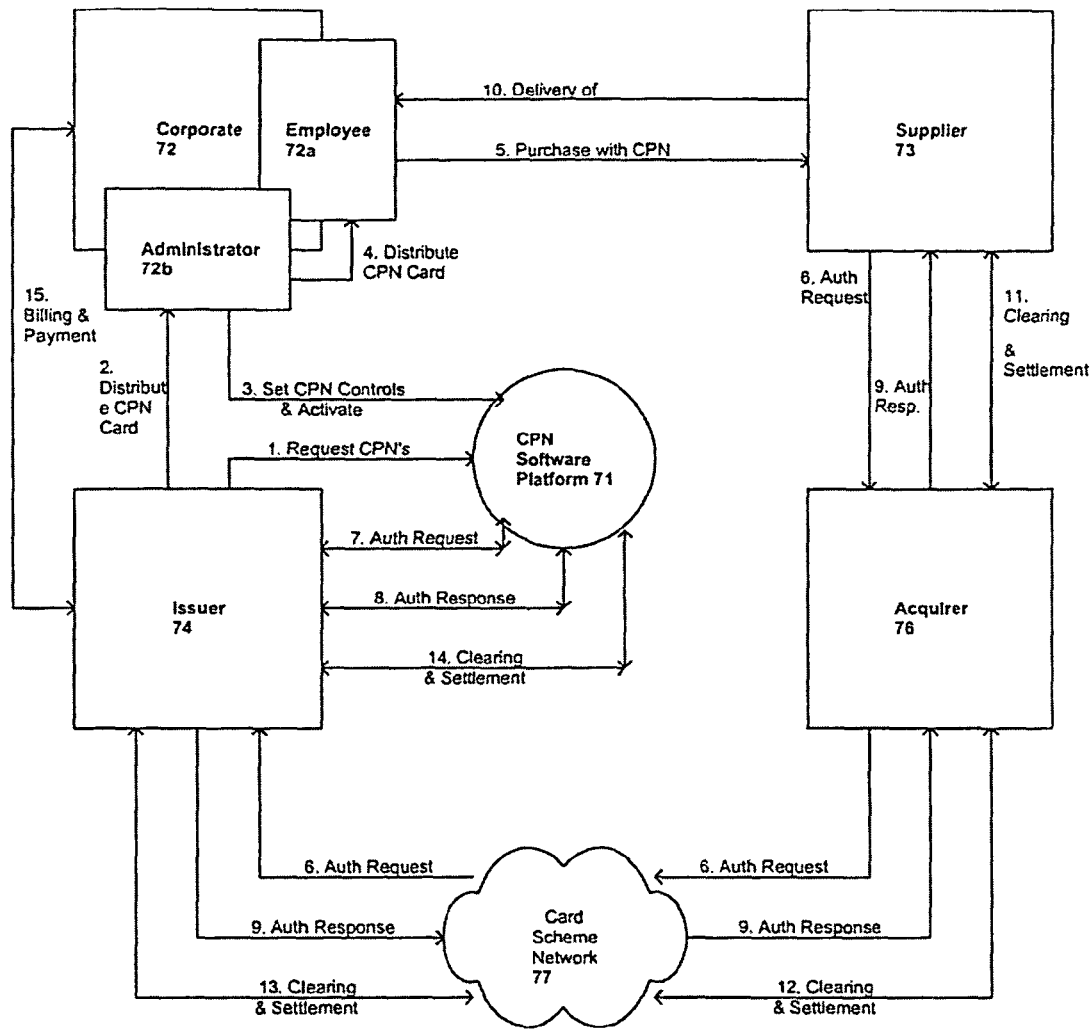
FIG. 7 is a flow chart in accordance with the present invention for a declining balance card.

A company 72 issues standard card plastic to selected employees 72a. The selected employees 72a can use this card in a pre-set list of merchants or suppliers 73 and the selected employees 72a can spend up to a specified maximum amount annually with the card, for instance. This amount can be periodically (e.g., annually such as on anniversary of card issuing date) renewed or restored. The present invention involves the following exemplary steps for a declining balance card, as illustrated in FIG. 7.

Step 1. The issuing bank 74 registers a company 72 on the CPN software platform 71 and submit requests to the CPN software platform 71 for controlled payment numbers (CPN's). The CPN's are issued against the company's 'real' account details with an 'Inactive' status.

Step 2. The issuing bank 74 produce the plastic cards with the CPN details replacing the 'real' account details. The cards are given to the company 72.

Step 3. The programme-administrator 72b in the company connects to the CPN software platform 71 using the browser-based front-end interface, for instance. The administrator 72b sets the control limits associated with the plastic CPN card, including the number of days before the balance is refreshed, the maximum spend limit during that period, and the merchants/merchant-categories with which the card can be used. The administrator 72b activates the CPN card.

Step 4. The card is given to the employee 72a.

Step 5. The employee 72a uses the card to make selected purchases with suppliers 73.

Step 6. The supplier 73 seeks authorisation for these purchase from the issuing bank 74 through his bank (acquirer) 76 and the card scheme networks 77.

Step 7. The issuing bank 74 recognises the BIN/BIN-range and routes the request to the CPN software platform 71. The CPN platform 71 checks whether the authorisation details are within the controls set by the programme administrator 72b. If not, the CPN platform 71 generates a decline response and returns it to the supplier 73 through the issuing bank 74/card-scheme 77/acquirer 76. Otherwise, the CPN details are replaced with the 'real' account details and the request is routed to existing authorisation processing in the issuing bank 74 (Card status ok? Sufficient Funds?).

Step 8. The response generated by the issuing bank's existing authorisation processing is returned to the CPN software platform 71. The platform 71 replaces the 'real' details with the CPN details and updates the CPN available-balance approval.

Step 9. The response is returned to the supplier 73 through to the issuing bank 74/card scheme 77/acquirer 76.

Step 10. The supplier 73 completes the transaction and delivers the goods/services.

Step 11. The supplier 73 presents the transaction to the acquirer 76 for settlement and is paid by the acquirer 76.

Step 12. The acquirer 76 presents the transaction to the card scheme 77 for settlement and is paid by the card scheme 77.

Step 13. The card scheme 77 presents the transaction to the issuing bank 74 and is paid by the issuing bank 74.

Step 14. The issuing bank 74 recognises the BIN/BIN-range and forwards the transaction to the CPN software platform 71. The available balance of the CPN is updated by the transaction amount. The platform 71 replaces the CPN details with the 'real' account details and routes the transaction to the issuing bank 74. The issuing bank 74 posts the transaction to the company's 'real' account.

Step 15. The issuing bank 74 bills the corporation 72 for transactions on the 'real' account as normal, including all CPN transactions, and the corporation makes payment.

The CPN software platform 71 is effective in controlling any card-present spending transactions if all transactions are presented to the issuing bank 74 for authorisation by the supplier 73. If there is no authorisation and the CPN available balance is near zero, the settlement transaction will still be posted to the 'real' account in a preferred embodiment.

IV. User Base Hierarchy for Generation of CPNs

The following provides a detailed description of exemplary embodiments of the present inventive B2B product and processing with respect to the user permissions and hierarchy as well as the functionality of the product. The current card schemes enhanced data capability and the functionality required of the CPN product to support them is also outlined.

Functionality Overview

Figure 9:
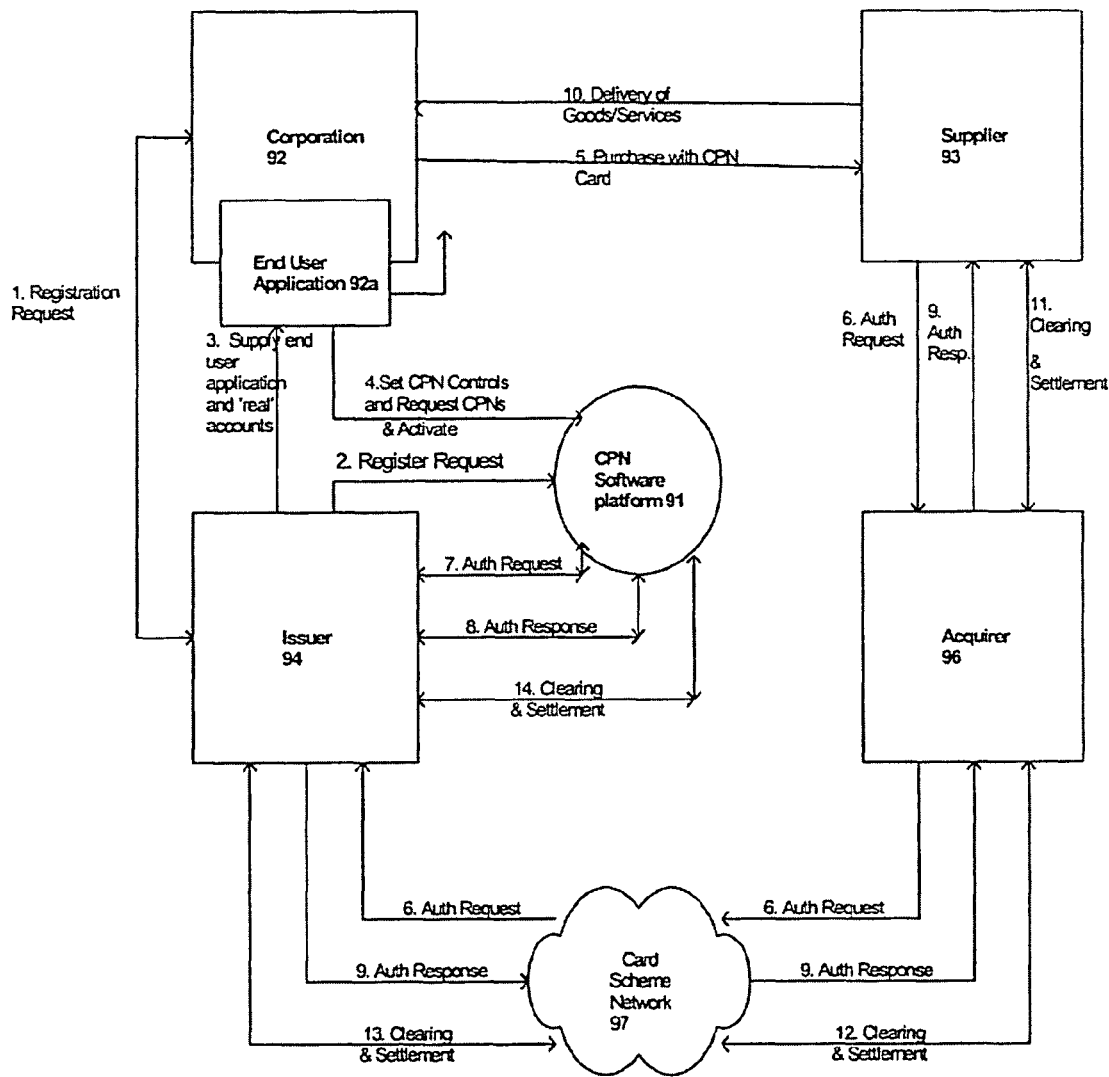
FIG. 9 is a flow chart in accordance with the present invention.

The inventive B2B CPN software platform 91, as shown in FIG. 9, can be stand-alone or hosted by a card scheme issuer 94 and integrated with its existing authorisation and account management system.

A company 92 can submit a registration request to the issuer 94, as determined and controlled by the issuer 94. (Step 1) The issuer 94 can process the registration request, including authenticating the company 92. The issuer 94 can then register the company 92 on the inventive B2B CPN software platform 91—through online, batch, or Customer Support Services (CSS), for instance. (Step 2) The registration request will include details of the primary user. The primary user will be supplied with authentication credentials (user-ID and password) and a CPN end-user software application (fat-, slim-, or thin-client) 92a. (Step 3)

Figure 8:
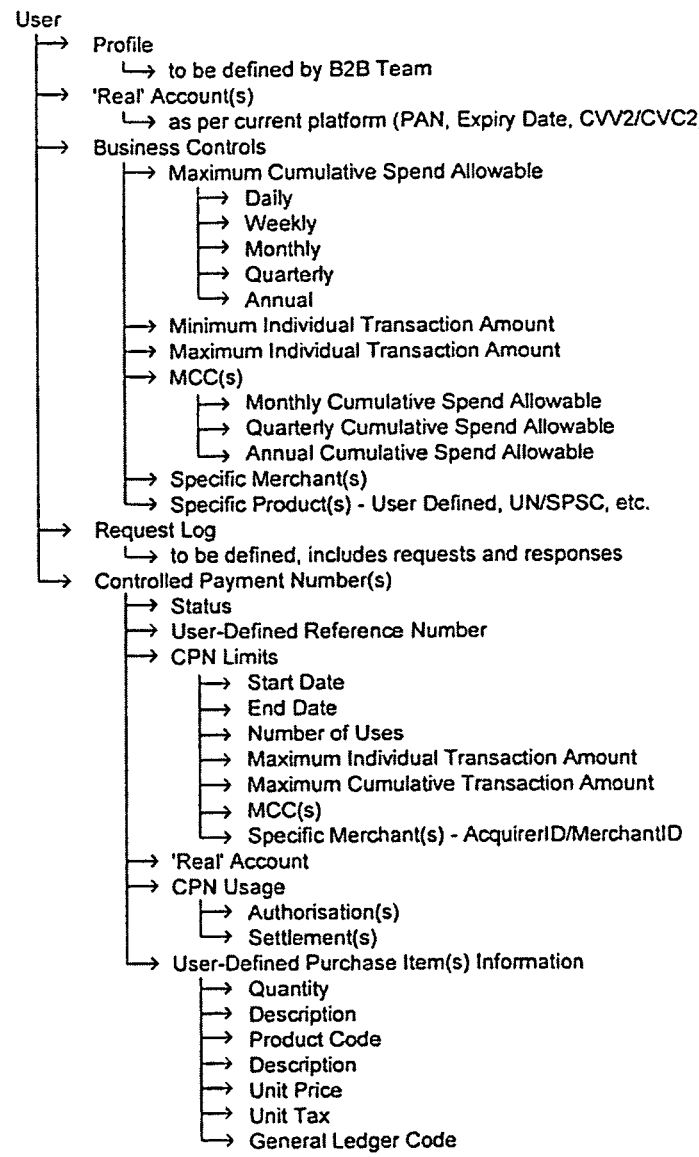
FIG. 8 illustrates a user profile within a B2B CPN software platform.

The primary user will launch the CPN end-user software application 92a and create the relevant user hierarchy of the company 92 on the system, such as shown in FIG. 8. If required the primary user can nominate other users as controlling users and they can create sections of the hierarchy that are relevant to them, e.g., department manager, as shown in the screen shot of FIG. 10.

Every user will be allocated one or more 'real' accounts that they can request CPN's against, although generally the 'real' account will not be directly usable or perhaps even not known to the user. The user will also have profile details stored for him or her. The company 93 also has the option to allocate purchase controls against each user, e.g., spend limits, merchant categories, and specific merchants. (Step 4) Each user is provided with a user-ID and password as their authentication credentials by the inventive B2B CPN software platform 91.

The user can request CPN's from the B2B CPN software platform 91 through the CPN end-user software application 92a or directly through an existing company system. The request is then identified and authenticated by the CPN software platform 91. The request details are then validated against the business controls if the user has been allocated them. The CPN is then issued with the required limits as specified in the request.

One of the limits that can be attached to a CPN is the start date. The user can set a start date that is in the future. This reflects deferred payment functionality in the payment instrument. The CPN software platform 91 will decline any authorisation requests for a CPN where the authorisation date is earlier than the CPN start date.

The CPN request can include an indicator to defer the activation of the CPN. If the inventive B2B CPN software platform 91 receives an authorisation for an inactive CPN, the request will be declined. The user can update the CPN after requesting an update. The update can change the 'real' account to be used, and modify the CPN limits or purchase details. Only the purchase details, i.e., the line item details of the purchase, effectively the purchase order details can be updated after the CPN has been activated.

The B2B CPN software platform 91 will include a user permissions module that controls the actions that each user can perform, e.g., creating and maintaining users, updating CPN details, activating CPN details, and reporting CPN activity. Every user that is created is assigned privileges.

The CPN can be used as the payment instrument in a B2B purchase. If the user is purchasing through an Internet website and has requested a CPN through the CPN end-user software application 92a, the user can use the form-fill functionality to fill the website form with the payment instrument, billing, and shipping profiles. If the website profile is not available the user can drag 'n'drop the individual fields into the website form.

The supplier 93 presents the CPN for authorisation to the issuer 94 through an acquirer 96 and the rest of the card scheme network 97 (Step 6). The request is forwarded to the B2B CPN software platform 91 (Step 7), which is to check the request against the CPN limits and previous uses. The request is to be declined if the limits are exceeded, otherwise the request is forwarded to the issuer's authorisation system to check against the 'real' card account (Step 8). The response (approve or decline) is returned to the supplier through the card scheme network 97 (Step 9). If accepted, the supplier delivers the goods or services to the corporation 92 (Step 10)

The supplier 93 presents the transaction to its bank, the acquirer 96, for settlement (Step 11). The transaction is then routed to the issuer 94 through the card scheme network 97 (Steps 12 and 13). The issuer 94 forwards the transaction to the B2B CPN software platform 91 Step 14). The transaction is then matched with the corresponding authorisation, and checked against the CPN limits and previous uses. The transaction will be logged. The transaction can be flagged if it 'breaches' the CPN limits, if required by the issuer 94. The CPN details are replaced with the 'real' details and the transaction is posted to the 'real' account on the issuer's account management system.

The issuer 94—through online, batch, or CSS—can maintain the 'real' account details for the company 92. The users with appropriate permissions can be permitted to maintain the user hierarchy through the CPN end-user software application 92a.

The B2B CPN software platform 91 can be able to accept transaction information from the issuer 94 for the company's non-CPN spending transactions. The details will be in standard card scheme format. The details will be accessible to the appropriate company users in reports from the CPN end-user software application 92a. The system will also be able to accept related transaction information from nominated third-parties and link it with the corresponding transaction details for the company's reporting requirements.

The B2B CPN software platform 91 can accept requests from appropriate company users for transaction information in a generic file format. The request can be sent through the CPN end-user software application 92a or an existing company system. The company can reformat the file into its required format for processing in its systems, e.g., general ledger or reporting system.

V. User Hierarchy

The B2B CPN software platform 91 can be made to accommodate multiple users within each company 92. Users will have different permissions assigned to them. These are detailed below.

As well as permissions, each user will have a profile and 'real' account(s). Users may also have controls assigned to them. The user will request CPN's that are associated with one of the assigned 'real' cards and may include user-defined information. This logical schema is outlined in FIG. 8 and the text related thereto.

User Permissions

The issuer 94 can create the primary users during registration. The primary users can create the user hierarchy through the CPN end-user software application as explained above and in more detail below. Every user can be assigned permissions as below:

| Permission | Description |
| --- | --- |
| Primary_User | The user has all permissions on the hierarchy. The user can create, maintain, and delete users across the hierarchy-not just subordinate users Are there any users that are not subordinate? (i.e., users at a lower level on the hierarchy and related to them). |
| User_Create | The user can create subordinate users on the hierarchy. The user can create multiple levels below them, not just the next immediate level. |
| User_Maintain | The user can change and update any subordinate users (the subordinate user can be several levels below the user). |
| User_Delete | The user can delete subordinate users. The relevant user will not be deleted from the system, |

-continued

| Permission | Description |
| --- | --- |
|  | as there may be a requirement for historic reporting of this user's activity. |
| CPN_Request | The user can submit a CPN request to the system. The user's authentication credentials (user-ID and password, alternatively-it may be signed messages after local authentication to the business rules system) are included on the request message. |
| CPN_Update_Early | The user can update the reference number, limits, and user defined purchase details for a CPN that they have created/requested. This permission is only effective until the CPN is 'Activated'. |
| CPN_Update_Late | The user can update user-defined information associated with a CPN that they have created/requested after the CPN has been 'Activated'. |
| CPN_Update_Card | The user change the 'real' account attached to a CPN they have created/requested. This may only be updated before the CPN is 'Activated', irrespective of other user permissions. |
| CPN_Activate | The user can activate/approve a CPN that it has requested/created. |
| CPN_Close | The user can close/de-activate a CPN that it has requested/created. |
| CPN_Control | The user can update, activate, and close the CPN's of any of its subordinates. The user has full control permission on its subordinate's CPN's. |
| CPN_Activity | The user can view any activity (authorization, settlement, and disputes) on a CPN it has requested/created. |
| Report_CPN | The user can generate reports on CPN activity of its subordinates. |
| Report_Global | The user can generate reports on CPN activity of any user in the hierarchy. |
| File_Generate | The user can generate a file, in a CPN software platform-defined standard format, of CPN transaction-related information. This is related to report permissions assigned to the user-the user can only generate files of information for which it has permission to report on. |

Each permission can be switched on/off for every user.

User Schema

The logical user_schema for every user is reflected in FIG. 8. The different elements of the user_schema are detailed below.

Profile

Every user will have profile information associated with them. The profile information will describe the principal elements of the user, as below: Name; address; contact details; etc.

The user permissions, defined above, can be included as part of the profile information. Each permission is to be switched ON or OFF for the user.

The profile of every user will include a time-zone and corporate-calendar. This will be used by the system to determine which requests to include when checking a CPN request against a limit and the relevant previous requests (see below Each user will also have a user-base-currency. All monetary controls for this user will be in this currency.

'Real' Accounts

A user will be assigned a set of 'real' accounts during user creation and/or maintenance. A 'real' account is an account that exists on the issuer's account management system. It is the account that the CPN-related transaction is posted to. All CPN's that are issued must be associated with a 'real' account.

The 'real' account details are Primary Account Number (PAN) including PAN extension, Expiry Date, and the additional verification value (e.g. CVV2/CVC2).

The 'real' accounts that are assigned to a user are a subset of the 'real' accounts assigned to the user's superior/parent in the hierarchy. This rule must be checked every time the 'real' accounts are being assigned. Any existing CPN's on that account are processed as normal. No new CPN requests from this user will be allowed on this account.

Business Controls

Business rules are used by the company 92 to control the issuance of CPNs, e.g., only issue a CPN to a specific user if the merchant 93 in the request message is in the list of merchants allowable for that user. The controls cannot normally control the actual purchase as this can happen some time after the issuance of the CPN. This is far different than in U.S. Pat. No. 5,500,513 insofar as the CPN is not issued until the business rules are checked. In the system of U.S. Pat. No. 5,500,513, various authorizations can be changed on fixed accounts, but unique CPNs are not issued for each transaction. This means that various problems can occur, such as embarrassing declines that the end user may not have anticipated, problem which occur when the co-processer is not available and Stand-In Processing (STIP) is used, and a weakened ability to match purchases with payments without involving transmission of available information by merchants 93.

It is optional whether the user is assigned business controls or not. The company 92 may wish to use business rules processing on its existing systems. If the company 92 wishes to use a predefined business rules engine provided by a different company than the buyer company 92, the user is to be assigned business rules.

The CPN requests are to be checked against the controls, if invoked by the company 92. Various exemplary business controls are detailed below.

Maximum Cumulative Spend Allowable

The user can be assigned maximum limits for the value of CPN requests. There are limits associated with different time periods. Daily; weekly; monthly; quarterly; and annually.

The user-profile can hold the user's applicable time-zone and corporate-calendar. These can be used to determine which previous CPN requests in the database will be used when checking if the current CPN request exceeds the corresponding spend limit.

Example

A user is assigned a daily spend limit of $1000. He submits a CPN request for $200. The B2B CPN software platform 91 will calculate the available funds (limit—relevant previous spending amount) for today by subtracting the amount of CPN requests already submitted today (as determined by the user's time-zone) from the corresponding daily limit. The corporate-calendar can be used to indicate which month is the start of the financial year for the company 92. This is used to determine which months are in each quarter for the company 92. The B2B CPN software platform 91 can then determine which previous CPN requests are relevant when performing the Quarterly and Annual checks against a new CPN request.

Minimum Individual Transaction Limit

This is the minimum amount from which any single CPN can be requested. If the CPN request is for a different currency than the user-base-currency, the system can convert the CPN request amount to the user-base-currency when comparing it against the minimum individual transaction limit.

Maximum Individual Transaction Limit

This is the maximum amount for which any single CPN can be requested.

If the CPN request is for a different currency than the user-base-currency, the system can convert the CPN request amount to the user-base-currency when comparing it against the minimum individual transaction limit.

Merchant Category Code (MCC)

A user can be assigned a list of allowable MCC's that they can only request CPN's for, e.g., stationery, books, office or building supplies. The list of allowable MCC's that can be assigned to a user is a subset or a complete set of the allowable list of MCC's that are assigned to its superior/parent. This is checked at user creation/maintenance.

Each MCC that is assigned to a user can have allowable spend limits associated with it. These limits are used to control the cumulative amount of CPN's that the user can request within the corresponding time period. Three exemplary cumulative spend limits can be: Monthly, quarterly; and annually.

If the CPN request is for a different currency than the user-base-currency, the system can be made capable of converting the CPN request amount to the user-base-currency when comparing it against the cumulative spend limits within each specific MCC.

The user's time-zone and corporate calendar is preferably used when determining which previous CPN requests are relevant when performing the MCC Quarterly and Annual checks against a new CPN request.

Merchant

A user can be assigned a list of allowable merchants 93 for which he or she can request CPN's. The CPN system will hold the merchant identifiers as determined by the issuer 94, for instance, or according to any acceptable set of codes. The merchant identifier is not the card-acceptor-id that is included in card scheme messages. The issuer 94 will create merchants records in the issuer's B2B system and assign merchant identifiers to them. The relevant acquirer-id and merchant-ids for this merchant 93 will be stored within this merchant-id.

The CPN request will include the merchant identifier and the system will check that the user can request CPN's from this merchant.

Product

Each user can be assigned a list of allowable products of types of products for which the user can request CPN's. The company will create a list of products on the B2B system. The list is company-specific and will preferably include the product identifiers that the company uses. Each user is assigned a subset of a complete set of this company list.

The CPN request will include the product identifiers for which the CPN is been generated. The system will check that the user can request CPN's for these products.

Request Log

The B2B CPN software platform 91 will preferably log every CPN request submitted by every user and the response the system supplied, i.e., approve or decline. The B2B CPN software platform 91 can use this log when checking a new CPN request against the appropriate user's business controls.

Reports may also be built from this log that will highlight CPN request activity for every user. The company 92 can be made able to pinpoint any user that is generating excessive declines and take appropriate action. For instance, if the CPN requests have been genuine, the company 92 can increase the relevant limits that have been causing the declines. Otherwise the company 92 can take internal action against a user that has been attempting to compromise the system.

Controlled Payment Numbers (CPNs)

A user can request CPNs from the CPN software platform 91. The CPN request will include the user credentials (user-ID and password). A CPN must have a 'real' card, status, and usage information associated with it. The CPN can also have limits and user-defined reference numbers and purchase information associated with it. Each component of the CPN is detailed below.

Status

The CPN will have a status associated with it. The order of available statuses will be: allocated; issued; activated; pre-auth; authorised; settled; cancelled; deleted, and archived.

Internally, the B2B CPN software platform 91 maintains a list of allocated CPN's as configured by the issuer. When the B2B CPN software platform 91 is issuing a CPN in response to a successful CPN request, it issues one of a predefined set of allocated CPN's, after setting the relevant controls on it. This minimises the amount of real-time processes that must be performed when handling a CPN request.

The CPN may be updated while the status is 'Issued' but once it is 'Activated', the CPN details are fixed.

User-Defined Reference Number

The user will be able to assign a reference number to a CPN. Typically this will be the tracking number that references the purchase order on the company's existing systems. The reference number will be included in the CPN request or can be added through the CPN end-user software application at a later date.

CPN Limits

There are several limits that can be applied to an issued CPN, as detailed in the table below.

They are all assigned prior to 'Activation' i.e. in the CPN request or later through the CPN end-user software application before the CPN status is changed from 'Issued' to 'Activated'.

| Limit | Description |
| --- | --- |
| Start Date | The date the CPN will be active from. Any authorisation request on this CPN before this date will be declined. |
| End Date | The date the CPN will be active until. Any authorisation request on this CPN after this date will be declined. |
| Number of Uses | The number of times the CPN can be used. |
| Individual Amount | The maximum amount any single transaction can be on the CPN. |
| Cumulative Amount | The maximum amount that all the transactions on the CPN can be. |
| Merchant Category Code(s) | The Merchant Category Code(s) that the CPN can be used in. |
| Specific Merchant(s) | The list of acquirer-id/merchant-id that the CPN can be used in. |

'Real' Account

A CPN must be associated with one 'real' account. The 'real' account exists on the issuer's account management system. This is the account that will be checked when processing an authorisation request to ensure the account is in good order (e.g. not lost, stolen, or closed) and has sufficient funds. It is also the account that all the CPN transactions will be posted against.

The 'real' account identifier (not the 'real' account) is included in the CPN request. If no account is included, the system will attach the user's default account or the client application can set the default account to be the account before making the request. It can be assigned or changed by any user with appropriate privileges through the CPN end-user software application before the CPN is 'Activated'.

CPN Usage

All authorisations (request and response), settlement presentments, and disputes/exceptions for a CPN are logged in a preferred embodiment of the B2B CPN software platform 91 at the issuing bank 94. This log is used when deciding whether a CPN usage is in 'breach' of the limits assigned to it. Reports of CPN activity may also be built from this log.

User-Defined Purchase Information

Every CPN can have user-defined purchase information assigned to it, as explained above. The purchase information will describe the items to be purchased using the CPN as the payment instrument. The B2B CPN software platform 91 does not have to use the purchase information in any processing. The user assigns the information with the CPN to assist them in identifying what items are associated with each payment when the payment is processed. The user can include this information in reports and files that are built.

The purchase information that can be stored with a CPN is: item sequence number (inserted by the B2B CPN software platform 91 per CPN request). A CPN may be related to the purchase of six types of items, i.e., lines on a purchase order—so there'll be six rows of purchase information with the sequence number being incremented by 1 from 1, for instance.

Item Reference Number
    Item Description
    Quantity
    Unit Price
    Unit Tax
    General Ledger Code
    Visa XML Invoice Specification—CPN end-user software application The user will have access to the CPN end-user software application 92a. The application 92a can be adapted for each client issuer 94 and/or corporation 94. The application 92 will be used as the front-end interface to the B2B CPN software platform 91. The user will be able to perform several functions using the application:

Configure Company Hierarchy
    Create users
    Maintain users controls and permissions
    Maintain user profile (including shipping and billing profiles)
    Request CPN
    List CPN's
    View CPN Details
    Update CPN
    Display reports on CPN Activity
    Generate file of CPN Activity
    Fill
    Drag 'n' Drop The CPN end-user software application 92a can generate messages that are processed by the B2B CPN software platform 91 and responded to accordingly. An existing company system can be changed to generate these messages and the B2B CPN software platform 91 will authenticate the source process the message and respond to it accordingly.

The desired functionality described above can include the following characteristics.

Registration

The company 92 contacts the issuer 94 and requests to be registered to use the B2B product. The issuer 94 collects the required registration details from the company—by paper form, on an Issuer web page, or using details the issuer already has.

The issuer 94 authenticates the company 92 and its card details before registering them on the B2B CPN software platform 91 online, batch file, or Customer Service System (CSS).

The registration request includes the main company details (contact information etc.), the 'real' accounts that can be used, and details of each primary user(s). The user-ID and password access credentials are generated for the primary user(s) and distributed to them. The credentials will be used to authenticate the user. The user can change the password through the CPN end-user software application 92a. The B2B CPN software platform 91 can be configured to force each user to change their password at first use.

The user accesses the B2B CPN software platform 91 through the CPN end-user software application 92a. The application 92a is downloaded after successful registration by every user or is available on the company's local network.

Company Hierarchy Configuration

Figure 10:
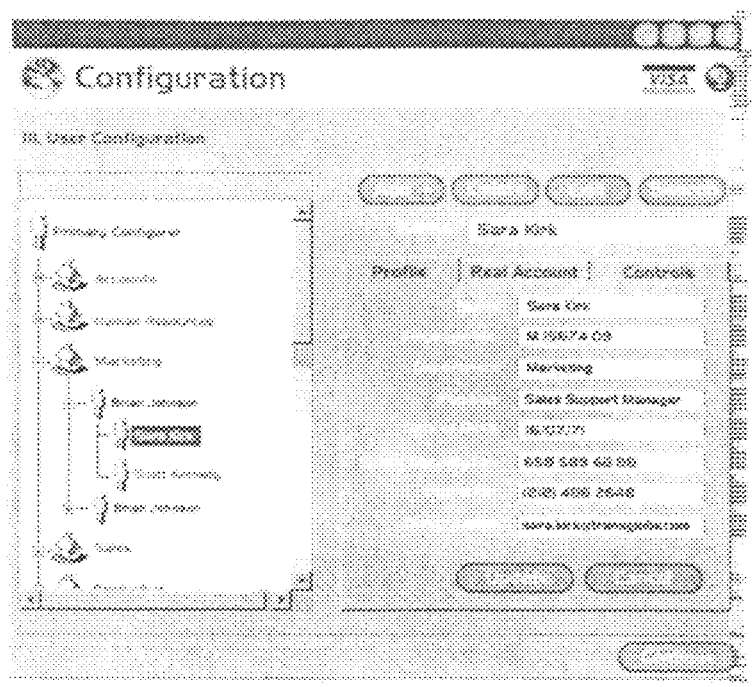
FIGS. 10-12 are sample screen shots showing various functions of the B2B CPN software platform for setting up a user profile.
Figure 11:
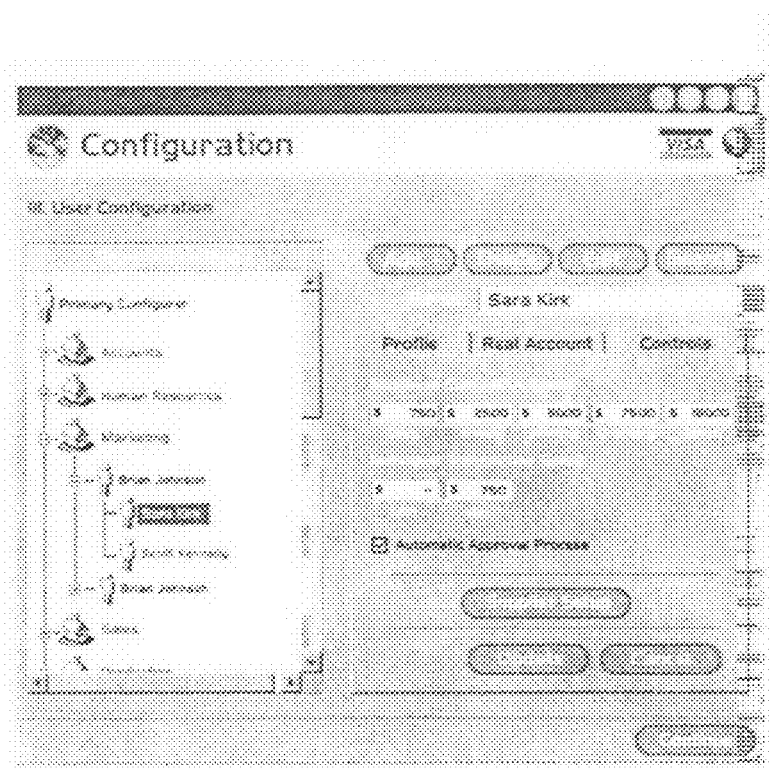
Figure 12:
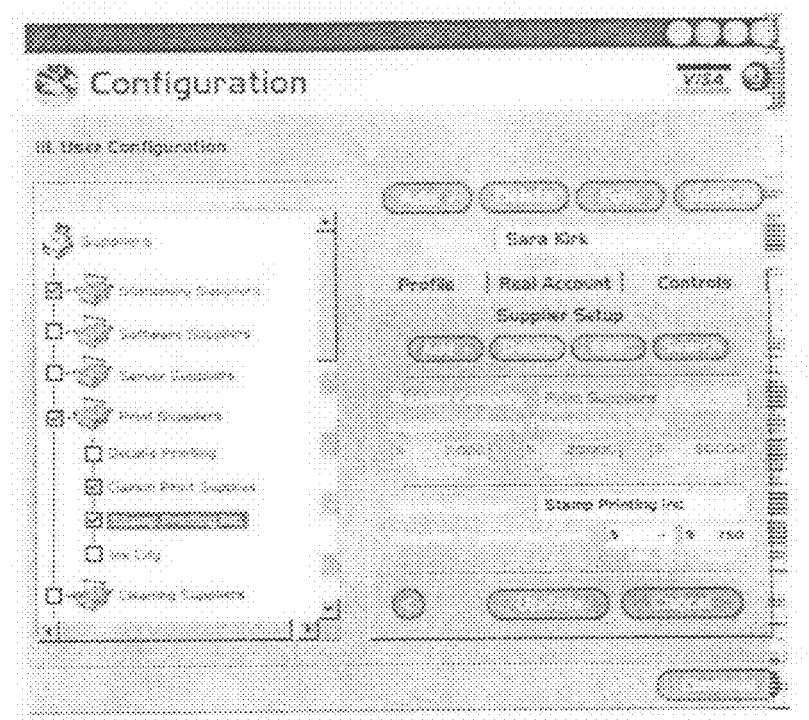

The company 92 may access the B2B CPN software platform 91 using the CPN end-user software application 92a and its access credentials. The company 92 registers each user that they wish to use the system. The registration request is built using the CPN end-user software application 92a. The user launches the application 92a and authenticate themselves using their user_id and password or other chosen authentication system. The application 92a can include a user interface that allows the user to view the user hierarchy (similar to the tree structure in NT Explorer) and create/update/delete users based on their permissions, such as shown in FIGS. 10, 11 and 12.

The user can select the parent of the new user and select the create option. The user can complete the details on the create screen and submit the request, as per the sample screen of FIG. 10.

The registration request includes the user's contact details, 'real' account(s) that the user can be issued CPN's against (these can be selected from a list of parent's accounts), and the user's permissions. The user level will also be nominated in the registration request by including the user_id of the parent in the user hierarchy.

Each user will be issued a user-ID and password. It is configurable whether the password needs to be changed on first usage. These details can be distributed to the e-mail address of the new user as per the details provided in the registration request. They can also be distributed to the user's creator by displaying through the CPN end-user software application or to their e-mail. This option is nominated as part of the registration request.

The company 92 may also elect to use the business controls of the B2B CPN software platform 91 to limit whether the user will be issued with a CPN or not, as per the sample screens laid out in FIGS. 11 and 12.

Authentication

The B2B CPN software platform 91 can be seamlessly integrated with an issuer's Internet Banking authentication subsystem. This means that the B2B CPN software platform 91 satisfies the issuers current security/authentication requirements. The B2B CPN software platform 91 generates a user-ID and password for each registered user. The user can use these details every time they use the CPN system to authenticate themselves. Alternative authentication systems will also be supported. All requests to the CPN system will include the user's user-id and password. These requests can be from the CPN end-user software application 92a or directly from a company's existing systems e.g. the purchase order system.

Chip card authentication can also be supported. The chip cards can be used as part of the authentication of a Card-Not-Present transaction. The system will also support client side certificates both for authenticating the cardholder as part of the SSL session and for authenticating the cardholder to the CPN system.

Maintenance

Issuer Maintenance

The issuer 94 maintains B2B CPN software platform 91 on-line, through a batch file, or using a CPN Customer Service System (CSS) in a preferred embodiment. The issuer maintains the 'real' account details for each registered company, e.g., card re-issue, and card replacement and their primary users. When an issuer updates the 'real' account details, e.g., new expiry date, the B2B CPN software platform 91 can reflect this update throughout a company's user hierarchy—the 'real' card may have been assigned to more than one user. All maintenance performed by the issuer 94 can be logged in the audit log.

User Maintenance

The user details are maintained on the B2B CPN software platform 91 in a preferred embodiment through the CPN end-user software application 92*a*. Depending on his or her relevant permissions, a user may create, update, or delete other users within the company's user hierarchy. This is performed using the graphical representation of the tree-hierarchy in the CPN end-user software application, as shown in FIG. 10, for instance. The company 92 is the top-level single-parent of the user hierarchy. The main company details are stored with the entity. Any user with primary_user permissions can maintain these details. All maintenance performed by a user will be logged in the audit log.

CPN Request

A user will request Controlled Payment Numbers (CPN's) to control their payments. The user requests the CPN using the CPN end-user software application 92*a* through a web browser or directly from an existing company system, e.g., a purchase system (the company system would be updated to produce a request message in the same format as an O-card request). All CPN requests include user authentication credentials. The request also includes the required CPN limits, the 'real' account to be used, and an indication whether the CPN is to be activated immediately or later. The CPN limits that can be associated with a CPN are:

Start Date (DDMMCCYY) [and optional HH:MM:SS]
End Date (DDMMCCYY) [and optional HH:MM:SS]
Number of uses (0=unlimited)
Minimum amount of any individual transaction—this can also be set through the product flag.
Maximum amount of any individual transaction
Merchant Category Code(s)
Specific Merchant(s)
Activation The user can be able to nominate the currency of the CPN monetary limits at request stage from a list of issuer-supported currencies on the B2B CPN software platform 91. The B2B CPN software platform 91 will check that the user requesting the CPN has appropriate permissions to request a CPN. If not, the system will return a message declaring that the request has not been successful due to insufficient user permissions.

The standard CPN business rule system will check if any business rules (controls assigned to the user) are breached before requesting a CPN. If no breaches are found, the system can return a message declaring that the request has not been successful due to a breach of a specific business control.

Business rules are checked at CPN request. CPN limits are checked at authorisation-(including reversals).

Workflow processing: If the request fails the business controls checking, the user will be presented with an option to request an override from their 'parent' user in the organisation hierarchy.

The CPN system will then issue a CPN and attach the required limits and 'real' account details. The CPN will be communicated to the user through the CPN end-user software application or directly to the company's existing system. The CPN comprises:

Primary Account Number (PAN)
Expiry Date (MMYY)
Additional Verification Value (CVV2 for Visa, CVC2 for MasterCard/EuroPay)

As an option to the company 92, user defined data may be associated with an issued CPN, as explained above. This includes a reference number and line item detail. This detail can be included in the CPN request or can be added to the CPN after the request.

CPN List

The B2B CPN software platform 91 can be queried for the CPN's issued to a particular user. This request can be through the CPN end-user software application 92*a* or directly from the company's existing systems. The request will include the user's authentication credentials. The request should include the user-id of the user whose CPN's is/are to be queried. This does not have to be the same as the user requesting the CPN's (e.g. manager viewing the CPN's for an employee).

All requests will include the user's authentication credentials—user-id and password. The B2B CPN software platform 91 should then check that the user has appropriate permissions to view the CPN's (refer CPN_Activity, Report_CPN, Report_Global).

If the user does not have appropriate permissions for this function the B2B CPN software platform 91 will generally return a message declaring that the request has not been successful due to insufficient permissions.

The B2B CPN software platform 91 will return the CPN's for the user-id included in the request to the CPN end-user software application 92*a* or the company's existing systems.

CPN Details

The user may request details of a specific CPN. The request is to include the CPN. This request will be through the CPN end-user software application 92*a* or direct from the company's existing systems. The request will include the user's authentication credentials. All requests will include the user's authentication credentials—user-id and password. The B2B CPN software platform 91 will check that the user has appropriate permissions to view the details (e.g. CPN_Activity, Report_CPN, Report_Global).

If the user does not have appropriate permissions for this function the B2B CPN software platform 91 will generally return a message declaring that the request has not been successful due to insufficient permissions.

The B2B CPN software platform 91 will return the CPN details to the CPN end-user software application or the company's existing systems. The details will include:

Status
Limits
'Real' Account—(account nickname or the actual number)
Usage to date (authorisations and settlements)
User-defined data.

CPN Update

A CPN can be updated through the B2B CPN end-user software application 92*a* or directly from the company's existing system. All requests are authenticated or pre-authenticated. The B2B CPN software platform 91 will check that the user has appropriate permissions to update the CPN. The update request will include the CPN PAN and the details to be updated. The user will be able to update the CPN limits, 'real' account details, and user-defined data depending on their permissions and the status of the CPN. If the CPN has been 'Activated' the CPN limits and 'real' account details cannot be updated.

The user will use this functionality to update the user-defined line-item detail to reflect what has been delivered and/or what has been invoiced. If the user has the CPN_Update_Late permission they can update the user-defined data of any CPN that they requested after it has been 'Activated'.

The User will also use this functionality to update the status of the CPN to "Activated", "Cancelled", or "Deleted". Only users with appropriate permissions will be allowed update the CPN status of their CPN's or the CPN's of other user's (refer CPN_Activate, CPN_Close, and CPN_Control There are two methods available to the user to defer a payment.

Activation

All CPN's can be activated by a user (via, e.g., a CPN Update). Any authorisation request routed to the B2B CPN software platform 91 will be declined if the CPN has not been activated i.e. the status is still 'Issued'. Any settlement that is presented to the B2B CPN software platform 91 for a transaction that has no matching authorisation will be forwarded to the issuer 94 with an indicator that the CPN had not been activated. The issuer 94 will decide how the settlement should be handled.

Start-Date

A CPN may have a limit associated with it in relation to the start-date (DDMMCCYY). It is optional whether the user associates a start-date with the CPN. If there is no start-date, it is assumed the start-date is the date of issue. The start-date may be included with the CPN request or added through a CPN update at any stage before the CPN is activated. Any authorisation request routed to the B2B CPN software platform 91 will generally be declined if the authorisation date is before the CPN start-date.

Any settlement (with no matching authorisation) that is presented to the B2B CPN software platform 91 with a transaction-date that is less than the CPN start-date will be forwarded to the issuer 94 with an indicator of the date conflict. The issuer 94 will decide how the settlement should be handled.

Authorisation

The merchant 93 may request an authorisation from the issuer 94 through the acquirer 96 and card scheme 97. The issuer 94 recognises the PAN as a CPN and route the request to the B2B CPN software platform 91.

The B2B CPN software platform 91 validates that the CPN account-number exists and has been activated, and that the expiry-date and additional-verification-value match with the details of the CPN.

The B2B CPN software platform 91 then checks the authorisation details against the CPN limits that have been set by the user.

The start-date must be less than or equal to the Transaction Date. If the user associated no start-date, the B2B CPN software platform 91 inserts the activation-date as the start-date.

The end-date must be greater than or equal to the Transaction Date. If the user associated no end-date, this check will be bypassed.

The number-of uses must be greater than the number of times the CPN has already been used. If the number-of-uses is 0, this check can be bypassed as 0 indicates there is no limit on the number of times the CPN can be used, i.e., infinity.

The individual-maximum-amount must be greater than the authorisation amount. If required, the CPN system will perform conversions as the currency of this CPN limit may differ from the currency of the authorisation amount. The CPN system can be configured to include a tolerance amount that the authorisation amount can exceed the limit by.

The cumulative-maximum-amount must be greater than the authorisation amount and the cumulative amount of any previous uses. If required, the CPN system will perform conversions as the currency of this CPN limit may differ from the currency of the authorisation amount. The CPN system can be configured to include a tolerance amount that the authorisation amount can exceed the limit by.

The merchant category code (MCC) in the authorisation request are included in the list of MCC's associated with the CPN. If there are no MCC's associated with the CPN, this check will be bypassed.

The acquirer-id and the merchant-id are included as a set in the list of acquirer-id/merchant-ids that are associated with a CPN. If there are no acquirer-id/merchant-ids associated with the CPN, this check will be bypassed. If the CPN has been configured by the user for 'merchant-latching', the B2B CPN software platform 91 will automatically associate the acquirer-id and merchant-id of the first authorisation request that is routed to it to the CPN.

If the authorisation request passes the validation and checks above, the CPN details will be replaced with the 'real' account details that are associated with the CPN and the 're-built' authorisation request will be routed to the issuer's authorisation system for approval.

If the request has failed the validation or checks, the B2B CPN software platform 91 will generate an authorisation response for the CPN with a decline response code and route it to the merchant 93 through the acquirer 96 and card scheme network 97. A decline advice will also be routed to the issuer's authorisation system with the 'real' account details.

The issuer's authorisation system decides the request and routes a response to the B2B CPN software platform 91. The B2B CPN software platform 91 matches the response with the original request it submitted. The B2B CPN software platform 91 then 're-builds' the response with the CPN details instead of the 'real' account details and routes the response to the merchant through the acquirer 96 and card scheme network 97.

The CPN usage information will be updated, based on the response sent to the merchant 93.

The B2B CPN software platform 91 allows a user to associate limits with a CPN but indicate that they should not be checked during the authorization. They can be used after-the-event though to generate a report of all transactions that happened that were outside the limits. The transaction will have been authorised and settled. This will facilitate users that are allowed spend in three specific suppliers and some day they need a widget urgently and none of the preferred suppliers have it in stock. They can get it from another supplier and this will be highlighted on a report for control monitoring only.

Current system functionality re: failures, timeouts, and logging will apply in a preferred embodiment. MCC and specific merchant latching can also apply if indicated at CPN request stage.

Settlement

The supplier 93 will present the transaction details to its bank (acquirer) 96 for settlement. The acquirer 96 will pay the supplier 93 and present the transaction to the card scheme 97 for settlement. The card scheme 97 will pay the acquirer and present the transaction to the relevant issuer for settlement. The issuer 94 will pay the card scheme 97 and will seek payment from the company 92.

The CPN details will be replaced with the corresponding 'real' account details and the transaction will be posted to the 'real' account on the issuer's account management system. This mapping will be performed by the B2B CPN software platform 91 or by the issuer 94, using a cross-reference file supplied by the B2B CPN software platform 91.

The issuer 94 routes the CPN transactions to the B2B CPN software platform 91 for authorisation and the CPN usage information will be updated accordingly. Essentially, the settlement processing will follow the core authorisation processing. The settlement information may also contain enhanced data, which the B2B CPN software platform 91 will recognise and store. MCC and specific merchant latching are also provided if indicated at CPN request stage.

Dispute Processing

The consumer will be able to dispute a transaction that has been posted to their 'real' account. The consumer will contact the issuer 94 and the issuer 94 will generally initiate a dispute. The outgoing information (copy voucher request or chargeback) will have the 'real' account details. The issuer 94 will route the outgoing transactions to the B2B CPN software platform 91. The 'real' details will be replaced with the CPN details and the transaction will be routed to the merchant 93 through the issuer 94, card scheme 97, and acquirer 96 network.

Customer Service

The issuer will use the CPN Customer Service System (CSS) to view and maintain all users of the B2B CPN software platform 91. The CSS will be able to display company hierarchy's to facilitate the issuer in identifying where a user is placed in the hierarchy. The issuer 94 will be able to view user permissions through the CSS in a preferred embodiment.

The CSS can also display transaction history for every CPN generated. The issuer 94 uses the reporting functions of the CSS to build standard or ad hoc reports on any CPN activity. The CSS Supervisors will be able to amend company details in most embodiments.

Reporting

A user will be able to generate reports of information on the B2B CPN software platform 91. All report requests can include the user's authentication credentials—user-id and password. The B2B CPN software platform 91 can check that the user has appropriate permissions to update the CPN. If not, the system can return a message declaring that the request has not been successful due to insufficient user permissions.

Transaction Reports

The user will request the report through the CPN end-user software application 92a or directly from the company's existing system. The user can request transaction information for different entities:

1. User (CPN and or 'real' transactions)
2. CPN
3. 'Real' account (including non-CPN activity).

The request will nominate which option is required and will include the necessary entity identification i.e. user-id, CPN, or 'real' account.

The user can nominate the parameters for the report:
Start Date and End Date (includes both dates)
Last 'n' transactions The transaction information is returned to the CPN end-user software application 92a or the company's existing system.

The CPN end-user software application 92a should include functionality that facilitates the printing of any reports that it displays.

CPN Request Reports

The user will be able to generate reports of CPN requests for each user if they have the correct permissions. The report will include the details of the request and the decision made by the B2B CPN software platform 91. Report on CPN usage that 'breaches' the CPN limits but has still been authorised i.e. the limit checking is switched off for authorisation but switched on for reporting.

General Ledger Interface

The user will be able to request an electronic format of a report on transaction activity. The file will be a generic format that the company will be able to reformat for their specific formats. The request will be from the CPN end-user software application 92a or directly from the company's existing system.

All file requests will include the user's authentication credentials—user-id and password. The B2B CPN software platform 91 will check that the user has appropriate permissions to update the CPN. If not, the system will return a message declaring that the request has not been successful due to insufficient user permissions.

'Real' Transactions

The system will be able to hold transaction information for card-present and card-not-present transactions for a company. In this way, all the transactions for a company are stored in one location that is easily accessible by the company for reporting and general ledger purposes.

The system will be able to store all enhanced data. The user will be able to include the non-CPN transaction information on reports that they can request through the CPN end-user software application or direct from the company's existing systems.

Third-Party Information

The B2B CPN software platform 91 accepts information on CPN transactions from third-party sources (i.e. non-Issuer) and collates it with CPN information in the system.

The present invention has been described in terms of exemplary embodiments to which it is not limited. For instance, the various method steps can be carried out by providing a computer with computer readable media which can be read by the computer. The method steps can be carried on by reading the computer readable media to program the computer to perform the steps of this method. Naturally, the present invention can be carried out on multiple computer, computer systems, and/or computer networks. Computer readable media means electronic, optical and hybrid memory media or systems, as well as signals carried over electrical connections, without departing from scope of the present invention.

What is claimed is:

1. A method of conducting commerce using controlled payment numbers (CPNs), comprising the steps of:

receiving, by one or more computers of a computer system, a request for issuance of a CPN by a user as an authorized substitute for a customer account number, the CPN issuance request including user-defined controls on the use of the CPN and user-defined payment delay for deferring payments on authorized transactions using the CPN;

issuing, by the one or more computers, a CPN in response to said CPN issuance request;

linking, in a database, by the one or more computers of the computer system, said user-defined controls and said user-defined payment delay to the CPN and the customer account number to the CPN at the time of the CPN issuance request and issuance;

receiving, at the one or more computers, a request for authorization including transaction details on a transaction using the CPN;

authorizing, by the one or more computers, the request for authorization to a card issuer through a card processing network when the transaction details comply with the user-defined controls; and deferring payment on the authorized transaction using the CPN according to the user-defined payment delay linked to the CPN in the database of the computer system, wherein the CPN is an authorized substitute for a customer account number in the card processing network that has user-defined controls on the use of the CPN in the card processing network including user-defined payment delay for deferring payments in the card processing network on authorized transactions using the CPN, and wherein the CPN is a number formatted identically to conventional financial transaction card numbers used in the card processing network.

2. The method of claim 1, wherein said payment delay is defined by said user in said CPN issuance request receiving step by defining a start date for processing said CPN that is later in time from a transaction date.

3. The method of claim 1, wherein said payment delay is defined by said user in said CPN issuance request receiving step by defining that the transaction must be approved by said user before settlement can occur.

4. The method of claim 1, further comprising:
receiving from an organization registration information at an issuer of CPNs;
receiving from registered organizations a definition of a hierarchy of users, in which at least one of the users is a supervisor having authority to define user rights for at least one other user;
defining user rights as a subset of all possible CPN uses for each of said users, said defined user rights subset being controlled by said supervisor for at least one other user;
receiving a CPN issuance request for issuance of a CPN by a user including defining CPN uses for particular transaction; and
checking said particular transaction user-defined CPN uses against said defined user rights subset of CPN uses for the requesting user to determine whether a CPN should issue for the requesting user's use.

5. The method of claim 4, further comprising the steps of:
sending said CPN to said user;
receiving a request for authorization for a transaction including transaction details that includes said CPN;
checking said received transaction details against said user defined CPN uses; and
approving said transaction when said received transaction details do not exceed said user defined CPN uses.

6. The method of claim 1, further comprising:
providing a physical CPN card which is linked to a company's actual account details;
receiving control limits set by a company associated with the physical CPN card, including at least one characteristic selected from the group consisting of: a number of days before an available balance is refreshed, a maximum spending limit during that period, and merchants/merchant-categories with which the card can be used;
activating the physical CPN card for use by an employee;
checking, by an issuer of the physical CPN card, when a purchase with the physical CPN card is attempted, whether authorization details are within the received control limits;
replacing the authorization details with the actual account details and routing the request for authorization to existing authorization processing, when the authorization details are within the received control limits set by the company; and
updating a remaining amount of the maximum spending limit of the physical CPN card when the physical CPN card purchase attempt is accepted.

* * * * *